(12) United States Patent
Marano et al.

(10) Patent No.: US 11,126,863 B2
(45) Date of Patent: Sep. 21, 2021

(54) DETECTION SYSTEM

(71) Applicant: Southwest Airlines Co., Dallas, TX (US)

(72) Inventors: Angela Marano, Dallas, TX (US); Daniel Novotny, Dallas, TX (US); Justin Bundick, Dallas, TX (US)

(73) Assignee: Southwest Airlines Co., Dallas, TX (US)

(*) Notice: Subject to any disclaimer, the term of this patent is extended or adjusted under 35 U.S.C. 154(b) by 236 days.

(21) Appl. No.: 16/434,069

(22) Filed: Jun. 6, 2019

(65) Prior Publication Data
US 2019/0377959 A1 Dec. 12, 2019

Related U.S. Application Data

(60) Provisional application No. 62/682,713, filed on Jun. 8, 2018.

(51) Int. Cl.
G06K 9/00 (2006.01)
G06Q 50/30 (2012.01)
G06T 7/285 (2017.01)

(52) U.S. Cl.
CPC ......... *G06K 9/00785* (2013.01); *G06Q 50/30* (2013.01); *G06T 7/285* (2017.01)

(58) Field of Classification Search
CPC ........... G06K 9/00785; G06K 9/00778; G06Q 50/30; G06T 7/285
See application file for complete search history.

(56) References Cited

U.S. PATENT DOCUMENTS

| 7,965,866 | B2 | 6/2011 | Wang et al. | |
| 7,987,111 | B1* | 7/2011 | Sharma | G06Q 30/02 705/7.29 |
| 9,449,233 | B2 | 9/2016 | Taylor | |
| 9,449,510 | B2 | 9/2016 | Saptharishi et al. | |
| 9,824,460 | B2 | 11/2017 | Quan et al. | |
| 9,990,540 | B2 | 6/2018 | Ariizumi et al. | |
| 2005/0169500 | A1* | 8/2005 | Takahashi | G06T 7/20 382/104 |
| 2009/0220123 | A1* | 9/2009 | Tojo | G06K 9/00771 382/103 |
| 2010/0214444 | A1* | 8/2010 | Teshima | H04N 5/23296 348/231.3 |

(Continued)

FOREIGN PATENT DOCUMENTS

WO 2011054971 A2 5/2011

Primary Examiner — Carol Wang

(57) ABSTRACT

A method for detecting objects in traffic flow includes identifying a location of a first camera and a second camera. The method includes determining a traffic flow direction. The method includes receiving a first image set captured by the first camera and a second image set captured by the second camera. The method includes identifying an object of a first object type in the first image set based on the location of the first camera and the traffic flow direction. The method includes identifying an object of a second object type in the second image set based on the location of the second camera and the traffic flow direction. The method includes recording the object of the first object type as a single incremented count in a first object type queue and the object of the second object type as a single incremented count in a second object type queue.

20 Claims, 8 Drawing Sheets

(56) References Cited

U.S. PATENT DOCUMENTS

| | | | |
|---|---|---|---|
| 2011/0007139 A1* | 1/2011 | Brunetti | G08B 13/19669 |
| | | | 348/51 |
| 2013/0182904 A1* | 7/2013 | Zhang | A61B 5/1073 |
| | | | 382/103 |
| 2014/0161316 A1* | 6/2014 | Golan | G06K 9/00261 |
| | | | 382/103 |
| 2018/0204335 A1* | 7/2018 | Agata | G08B 29/188 |
| 2018/0286081 A1* | 10/2018 | Koperski | G06K 9/00771 |
| 2019/0035104 A1 | 1/2019 | Cuban et al. | |
| 2019/0230320 A1* | 7/2019 | Moriya | G06K 9/00993 |
| 2019/0295007 A1* | 9/2019 | Shimode | G01C 21/20 |

* cited by examiner

DETECTION SYSTEM

CROSS-REFERENCE TO RELATED APPLICATION AND PRIORITY CLAIM

This application claims priority under 35 U.S.C. § 119(e) to U.S. Provisional Patent Application No. 62/682,713 filed on Jun. 8, 2018. The above-identified provisional patent application is hereby incorporated by reference in its entirety.

TECHNICAL FIELD

This disclosure generally relates to detection systems. More specifically, this disclosure relates to a human and object detection and recording system.

BACKGROUND

In transit systems, such as in airports, turn time is a major contributor to on-time performance. The time it takes for people and baggage to move between destinations, and the locations of people and baggage at any given time, has an impact on turn time. The locations of people and baggage also are significant for transit system security.

SUMMARY

This disclosure provides systems and methods for detecting and recording humans and objects.

In a first embodiment, the disclosure provides a method for detecting objects in traffic flow. The method includes identifying, by at least one processor, a location of a first camera and a location of a second camera. The method also includes determining, by the at least one processor, a traffic flow direction. The method further includes receiving, by the at least one processor, a first image set captured by the first camera and a second image set captured by the second camera. In addition, the method includes identifying, by the at least one processor, an object of a first object type in the first image set based on the location of the first camera and the traffic flow direction. The method includes identifying, by the at least one processor, an object of a second object type in the second image set based on the location of the second camera and the traffic flow direction. The method also includes recording, by the at least one processor, the object of the first object type as a single incremented count in a first object type queue and the object of the second object type as a single incremented count in a second object type queue.

In a second embodiment, the disclosure provides a system for detecting object in traffic flow. The system includes a first camera, a second camera, and at least one processor. The at least one processor is configured to identify a location of the first camera and a location of the second camera. The at least one processor is also configured to determine a traffic flow direction. The at least one processor is further configured to receive a first image set captured by the first camera and a second image set captured by the second camera. In addition, the at least one processor is configured to identify an object of a first object type in the first image set based on the location of the first camera and the traffic flow direction. The at least one processor is configured to identify an object of a second object type in the second image set based on the location of the second camera and the traffic flow direction. The at least one processor is also configured to record the object of the first object type as a single incremented count in a first object type queue and the object of the second object type as a single incremented count in a second object type queue.

In a third embodiment, the disclosure provides a non-transitory, computer-readable storage medium. The non-transitory, computer-readable storage medium stores one or more electronically executable instructions that, when executed by at least one processor, cause the at least one processor to identify a location of a first camera and a location of a second camera. The one or more electronically executable instructions that, when executed by the at least one processor, also cause the at least one processor to determine a traffic flow direction. The one or more electronically executable instructions that, when executed by the at least one processor, further cause the at least one processor to receive a first image set captured by the first camera and a second image set captured by the second camera. In addition, the one or more electronically executable instructions that, when executed by the at least one processor, cause the at least one processor to identify an object of a first object type in the first image set based on the location of the first camera and the traffic flow direction. The one or more electronically executable instructions that, when executed by the at least one processor, cause the at least one processor to identify an object of a second object type in the second image set based on the location of the second camera and the traffic flow direction. The one or more electronically executable instructions that, when executed by the at least one processor, also cause the at least one processor to record the object of the first object type as a single incremented count in a first object type queue and the object of the second object type as a single incremented count in a second object type queue.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable storage medium. The terms "application" and "program" refer to one or more computer programs, software components, sets of instructions, procedures, functions, objects, classes, instances, related data, or a portion thereof adapted for implementation in a suitable computer readable program code. The phrases "computer readable program code" and "executable instruction" includes any type of computer code, including source code, object code, and executable code. The phrase "computer readable medium" and "computer-readable storage medium" includes any type of medium capable of being accessed by a computer or a processor, such as read only memory (ROM), random access memory (RAM), a hard disk drive, a compact disc (CD), a digital video disc (DVD), or any other type of memory. A "non-transitory" computer-readable medium and a "non-transitory" computer-readable storage medium exclude wired, wireless, optical, or other communication links that transport transitory electrical or other signals. A non-transitory, computer-readable medium and a non-transitory, computer-readable storage medium include media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
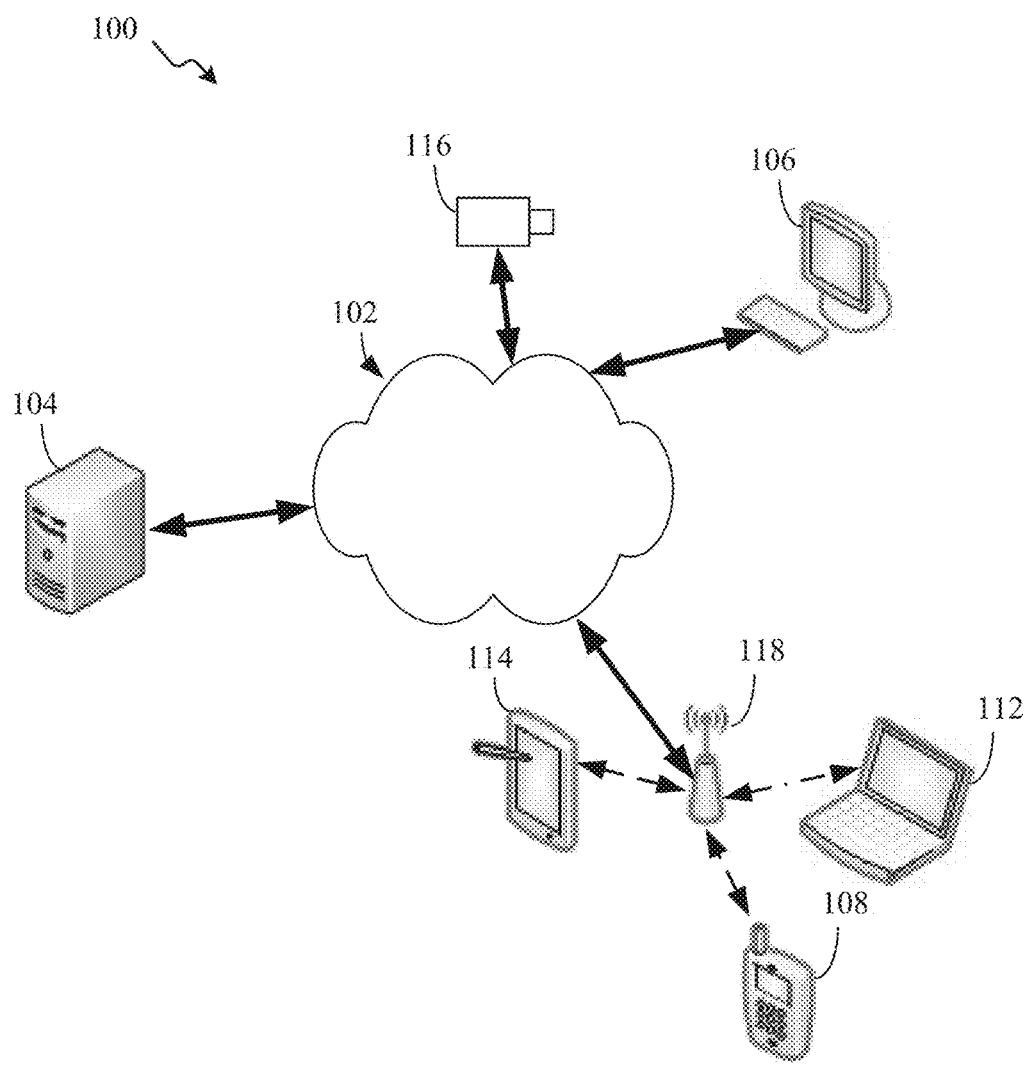
FIG. 1 illustrates a non-limiting, example detection system for detecting and recording humans and objects according to certain embodiments of this disclosure.

FIG. 1 illustrates a non-limiting, example detection system 100 according to certain embodiments of this disclosure. The embodiment of the detection system 100 shown in FIG. 1 is for illustration only. Other embodiments of the detection system 100 could be used without departing from the scope of this disclosure.

The detection system 100 includes a network 102 that facilitates communication between various components in the detection system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between one or more various servers 104 and various devices 106, 108, 112, 114, and 116. Each of the one or more servers 104 includes any suitable computing or processing device that can perform computing operations as described herein. Each of the one or more servers 104 could, for example, include one or more processing devices, one or more memories storing instructions and data, and one or more network interfaces facilitating communication over the network 102. In certain embodiments, the one or more servers 104 may include at least one of central processing unit (CPU) or a graphics processing unit (GPU).

Each device 106, 108, 112, 114, and 116 represents any suitable computing or processing device that interacts with at least one of the one or more servers 104 or other computing device(s) over the network 102. For example, the devices 106, 108, 112, or 114 include a desktop computer 106, a mobile telephone or mobile devices 108 (such as a smartphone), a laptop computer 112, and a tablet computer 114. The detection system 100 also includes one or more image capturing devices 116. Each of the one or more image capturing devices 116 may include a camera, a video recording device, or another device capable of capturing images of people and objects. Each of the one or more image capturing devices 116 are placed at various locations within a facility to capture and provide continuously updated images of the various locations to the one or more servers 104, or the other devices 106, 108, 112, or 114 over the network 102. For example, the one or more image capturing devices 116 may include a first image capturing device and a second imaging capturing device positioned a distance apart from each other and having lens facing each other to capture images of people and objects as described herein. The images may be used for detecting people or objects and counting people or objects that move along a direction of traffic flow of the people or objects. In some embodiments, the one or more image capturing devices 116 may be included as at least a part of one of the other devices 106, 108, 112, or 114. The other devices 106, 108, 112, or 114 may be used for monitoring information received from the one or more image capturing devices 116, or from the server(s) 104. For example, the tablet computer 114 may be used by transit personnel to view images taken by the one or more image capturing devices 116, and receive notifications regarding the images, such as if all passengers have boarded or exited an aircraft. Any other or additional client devices could also be used in the detection system 100.

In this example, some client devices 106, 108, 112, or 114 communicate indirectly with the network 102. The client devices 108, 112, and 114 (mobile device, laptop computer, and tablet computer, respectively) can communicate via one or more wireless access points 118, such as IEEE 802.11 wireless access points. The one or more image capturing devices 116 can be hardwired to one or more servers 104 or to one or more of the other client devices 106, 108, 112, or 114, or can also communicate with the one or more servers 104 or one or more other client devices 106, 108, 112, or 114 over the network 102 using the one or more wireless access points 118. Note that these one or more servers 104 and these one or more client devices 106, 108, 112, or 114 are for illustration only and that each of the one or more servers 104 and each client device 106, 108, 112, or 114 could communicate directly with the network 102 or indirectly with the network 102 via any suitable intermediate device(s) or network(s).

In certain embodiments, the one or more image capturing devices 116 (or any other client device 106, 108, 112, and 114) can transmit information securely and efficiently to another device, such as, for example, the one or more servers 104. The one or more image capturing devices 116 (or any other client device 106, 108, 112, and 114) can receive information securely and efficiently from another device, such as, for example, the one or more servers 104. The one or more image capturing devices 116 (any other client device 106, 108, 112, and 114 or one or more servers 104) can transmit or receive information to be processed as an input(s) into a neural network. Such information can include image data, voice/audio data, geolocation data, or other data received by or stored on the one or more image capturing devices 116 (any other client device 106, 108, 112, and 114 or one or more servers 104).

The processes and systems provided in this disclosure allow for an image capturing device, a client device, or a server to provide a result processed by a neural network. In certain embodiments, an image capturing device (e.g., image capturing device 116), a client device (e.g., client device 106, 108, 112, or 114), or one or more servers (e.g., one or more servers 104) can determine the neural network result. In certain embodiments, a client device (e.g., client device 106, 108, 112, or 114) or an image capturing device (e.g., image capturing device 116) receives the data to be included as inputs into a neural network and transmits the data over the network 102 to the server(s) 104, which determines the output(s) using the neural network.

Although FIG. 1 illustrates one example of a detection system 100, various changes can be made to FIG. 1. For example, the detection system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
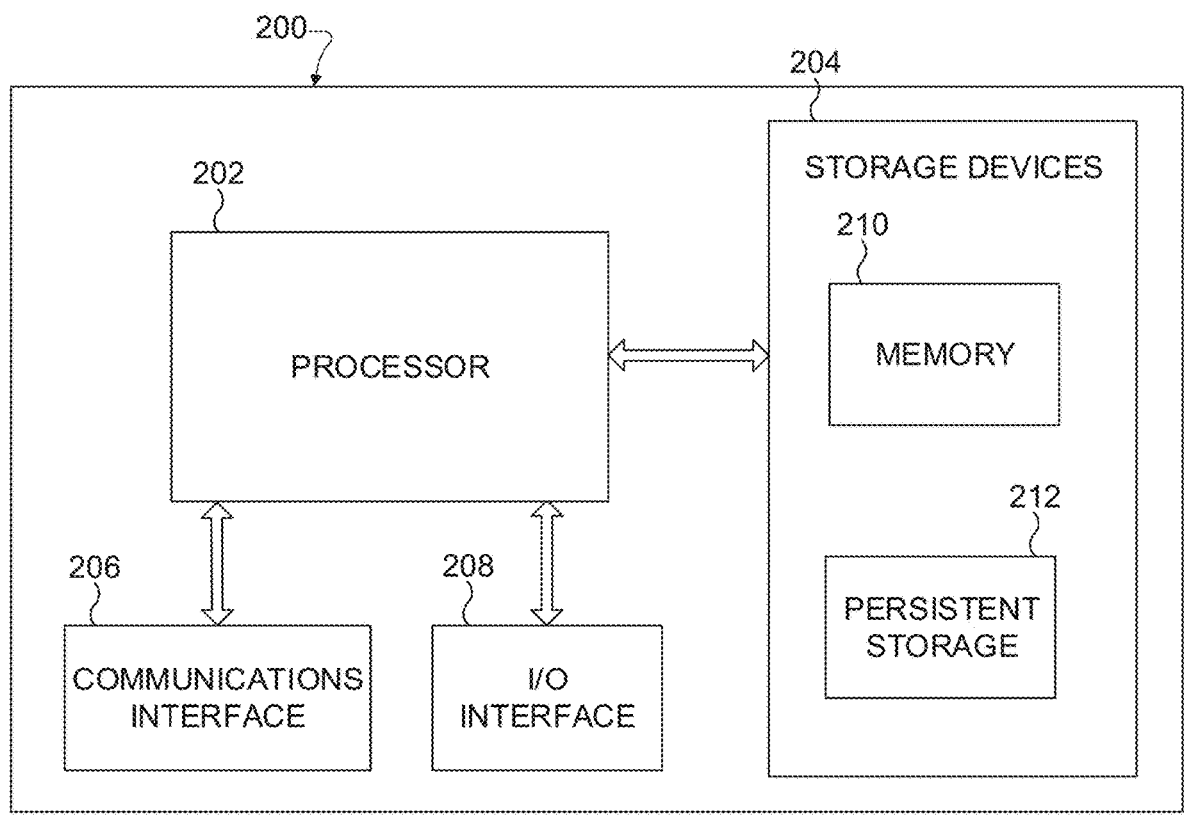
FIGS. 2 and 3 illustrate non-limiting, example electronic devices for detecting and recording humans and objects according to certain embodiments of this disclosure.

FIG. 2 illustrates a non-limiting, example electronic device 200 according to certain embodiments of this disclosure. The embodiment of the electronic device 200 shown in FIG. 2 is for illustration only. Other embodiments of the electronic device 200 could be used without departing from the scope of this disclosure. The electronic device 200 could, for example, represent a server of the one or more servers 104, a client device of the one or more client devices 106, 108, 112, or 114, an image capturing device of the one or more image capturing device 116, or may be part of the network 102 of FIG. 1.

As shown in FIG. 2, the electronic device 200 includes at least one processor 202, at least one storage device 204, at least one communications interface 206, and at least one input/output (I/O) interface 208. The processor 202 executes instructions that may be loaded into a memory 210, such as instructions that (when executed by the processor 202) implement the server 104. The processor 202 includes any suitable number(s) and type(s) of processors or other processing devices in any suitable arrangement. Example types of processors 202 include microprocessors, microcontrollers, digital signal processors, field programmable gate arrays, application specific integrated circuits, and discrete circuitry. In certain embodiments, the processor 202 could be divided into multiple processors, such as one or more central processing units (CPUs) and one or more graphics processing units (GPUs). In certain embodiments, the processor 202 may execute one or more (or all) of the processes or operations described herein.

The memory device 210 and a persistent storage 212 are examples of storage devices 204, which represent any structure(s) capable of storing and facilitating retrieval of information (such as data, program code, and/or other suitable information on a temporary or permanent basis). The memory device 210 may represent a random-access memory or any other suitable volatile or non-volatile storage device (s). The persistent storage 212 may contain one or more components or devices supporting longer-term storage of data, such as a read only memory, hard drive, Flash memory, or optical disc. In certain embodiments, the memory device 210 may store one or more queues with each queue associated with an object type. The memory device 210 may store single incremental counts of objects of an object type in an associated queue. In certain embodiments, the memory device 210 may store one or more schedules of predicted traffic flow as described herein.

The communications interface 206 supports communications with other systems or devices. For example, the communications interface 206 could include a network interface card or a wireless transceiver facilitating communications over a wired or wireless network. The communications interface 206 may support communications through any suitable physical or wireless communication link(s). Note, however, that the use of the communications interface 206 may not be needed, such as when the device 200 processes data locally and does not need to engage in network communications.

The I/O interface 208 allows for input and output of data. For example, the I/O interface 208 may provide a connection for user input through a keyboard, mouse, keypad, touchscreen, or other suitable input device. The I/O interface 208 may also send output to a display, printer, or other suitable output device. Note, however, that the use of the I/O interface 208 for local I/O may not be needed, such as when the device 200 is accessible locally or remotely over a network connection.

Although FIG. 2 illustrates one example of an electronic device 200, various changes may be made to FIG. 2. For example, electronic devices come in a wide variety of configurations, and FIG. 2 does not limit this disclosure to any particular electronic device. In certain embodiments, the electronic device 200 could be divided into multiple processors, such as one or more central processing units (CPUs) and one or more graphics processing units (GPUs). In certain embodiments, the electronic device 200 may execute one or more (or all) of the processes or operations described herein.

Figure 3:
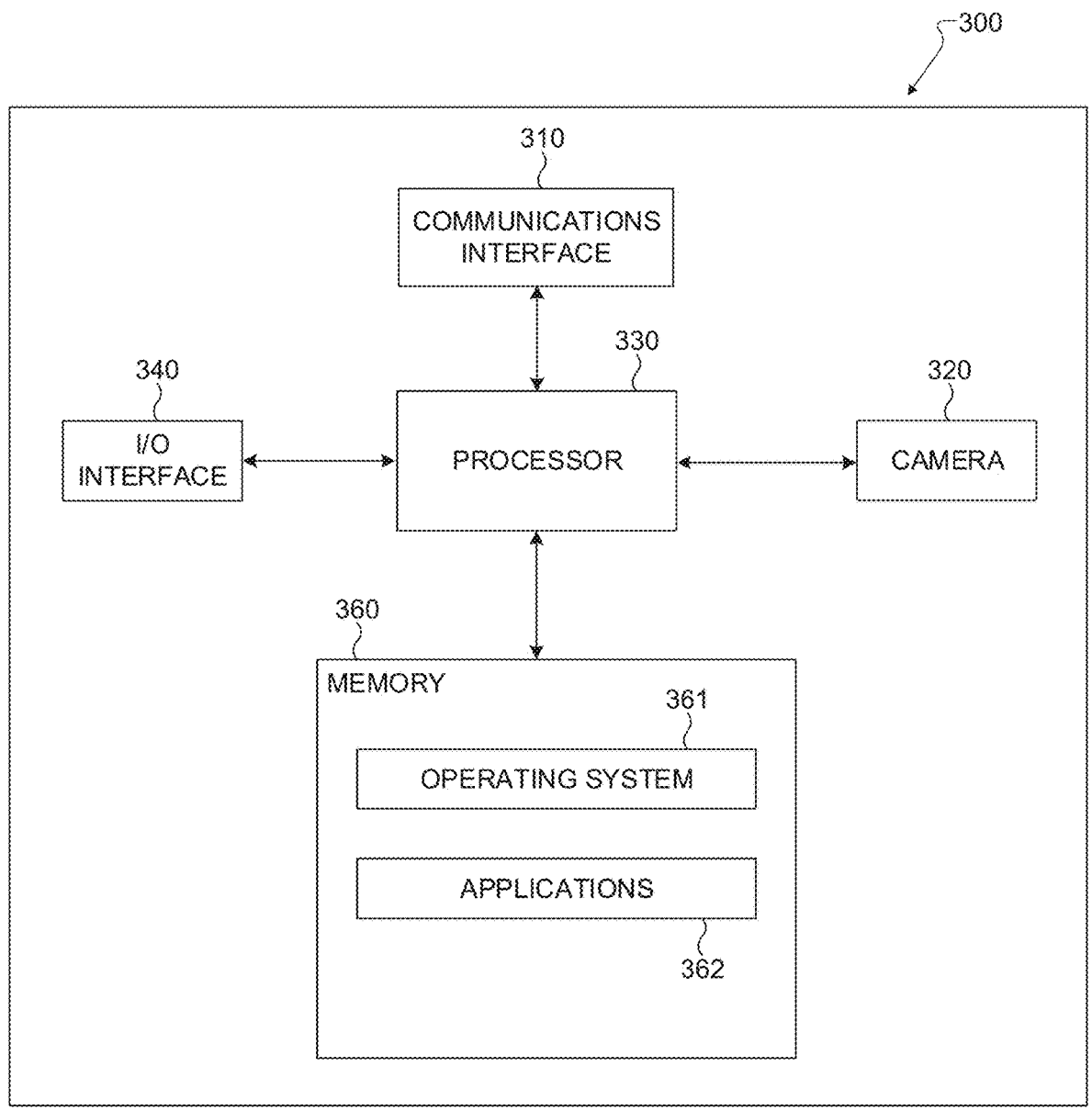

FIG. 3 illustrates an example electronic device 300 according to certain embodiments of this disclosure. The electronic device 300 could, for example, represent one of an image capturing device 116, a client device 106, 108, 112, or 114, or one or more servers 104 of FIG. 1. As shown in FIG. 3, the electronic device 300 includes a communications interface 310, a camera 320, a processor 330, an input/output (I/O) interface 340, and a memory 360. The memory 360 includes an operating system (OS) 361 and one or more applications 362.

The communications interface 310 supports communications with other systems or devices. For example, the communications interface 310 could include a network interface card or a wireless transceiver facilitating communications over a wired or wireless network. The communications interface 310 may support communications through any suitable physical or wireless communication link(s). Note, however, that the use of the communications interface 310 may not be needed, such as when the device 300 processes data locally and does not need to engage in network communications.

The camera 320 is for example, a device which may photograph or capture still images and/or record video. In certain embodiments, the camera 320 may include one or more image sensors, a lens, an Image Signal Processor (ISP) or a flash (e.g., LED). In certain embodiments, the camera 320 may also include a motion detector configured to detect motion of one or more objects within the view of the lens. For example, when the camera 320 detects motion, one or more processes, process steps, or operations (e.g., performed by a processor) described herein may be initiated.

The processor 330 can include one or more processors or other processing devices and execute the OS 361 stored in the memory 360 in order to control the overall operation of the electronic device 300. For example, the processor 330 could control the activation of the camera 320 and detect objects or people viewed by the camera 320. In some embodiments, the processor 330 includes at least one microprocessor or microcontroller. The processor 330 can move data into or out of the memory 360 as required by an executing process. The processor 330 is also coupled to the I/O interface 340, which provides the electronic device 300 with the ability to connect to other devices, such as laptop computers and handheld computers. The I/O interface 340 is the communication path between these other devices and the processor 330. In certain embodiments, the processor 330 could be divided into multiple processors, such as one or more central processing units (CPUs) and one or more graphics processing units (GPUs). In certain embodiments, the processor 330 may execute one or more (or all) of the processes or operations described herein.

The memory 360 is coupled to the processor 330. Part of the memory 360 could include a random-access memory (RAM), and another part of the memory 360 could include a Flash memory or other read-only memory (ROM). The memory 360 may store single incremental counts of objects of an object type in an associated queue. In certain embodiments, the memory 360 may store one or more schedules of predicted traffic flow as described herein.

Although FIG. 3 illustrates one example of electronic device 300, various changes may be made to FIG. 3. For example, various components in FIG. 3 could be combined, further subdivided, or omitted and additional components could be added according to particular needs. In certain embodiments, the electronic device 300 could be divided into multiple processors, such as one or more central processing units (CPUs) and one or more graphics processing units (GPUs). In certain embodiments, the electronic device 300 may execute one or more (or all) of the processes or operations described herein.

Figure 4:
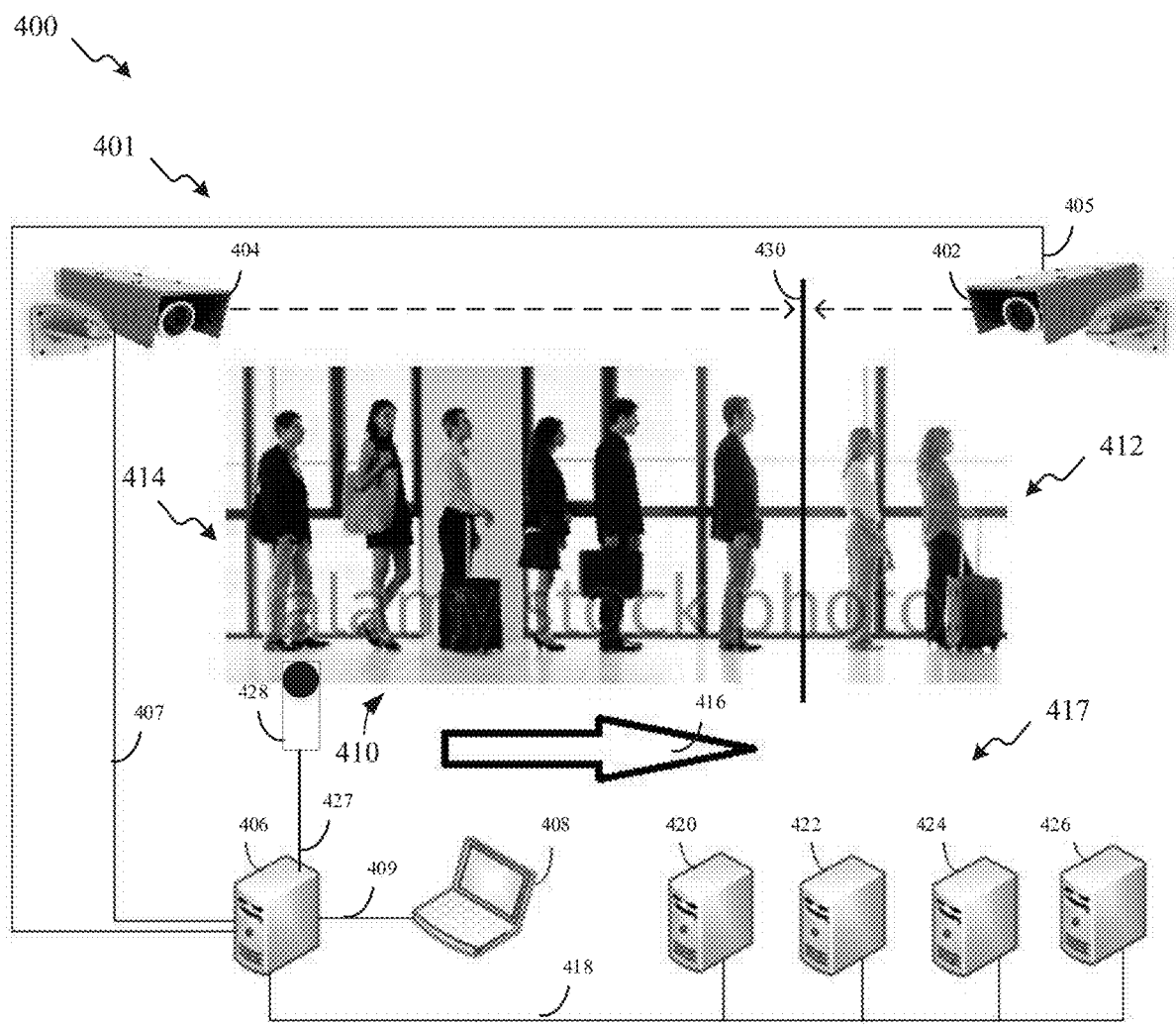
FIG. 4 illustrates a non-limiting, example environment for detecting and recording humans and objects using a detection system according to certain embodiments of the disclosure.

FIG. 4 illustrates a non-limiting, example environment 400 for detecting and recording humans and objects using a detection system 401 according to certain embodiments of the disclosure. As shown in FIG. 4, the example environment 400 includes the detection system 401. The detection system 401 includes a first camera 402, a second camera 404, a first server 406, and an electronic device 408. The first camera 402 and the second camera 404 may be the same as or at least similar to the image capturing device 116 illustrated in FIG. 1, the server 104 illustrated in FIG. 1, the client devices 106, 108, 112, or 114 illustrated in FIG. 1, the electronic device 200 illustrated in FIG. 2, or the electronic device 300 illustrated in FIG. 3. In certain embodiments, the first camera 402 or the second camera 404 may be configured to perform one or more (or all) of the processes or operations described herein. The first server 406 may be the same as or at least similar to the server 104 illustrated in FIG. 1, the electronic device 200 illustrated in FIG. 2, or the electronic device 300 illustrated in FIG. 3. In certain embodiments, the first server 406 may include one or more CPUs. Additionally, or alternatively, the first server 406 may include one or more GPUs. The electronic device 408 may be the same as or at least similar to the server 104 illustrated in FIG. 1, the client devices 106, 108, 112, or 114 illustrated in FIG. 1, the electronic device 200 illustrated in FIG. 2, or the electronic device 300 illustrated in FIG. 3. The first camera 402 and the second camera 404 may be communicatively linked to the server 406 through one or more communication channels 405 and 407 (e.g., wired communication channels or wireless communication channels). The electronic device 408 may also be communicatively linked to the server 406 through one or more communication channels 409 (e.g., wired communication channels or wireless communication channels). The electronic device 408 may be configured to display one or more output results of the processes or operations described herein.

In certain embodiments, the system 401 may include one or more additional servers 417 communicatively linked to the first server 406 via one or more communication channels 418 (e.g., wired communication channels or wireless communication channels). For example, the one or more additional servers 417 may include a second server 420, a third server 422, a fourth server 424, and a fifth server 426. In some embodiments, the first server 406 may include one or more CPUs and one or more GPUs. Additionally, or alternatively, the one or more additional servers 417 may include one or more GPUs. The first server 406 may receive an image captured by at least one of the first camera 402 or the second camera 404 and determine whether a GPU in the first server 406 or a GPU in a one of the one or more additional servers 417 is available to process the captured image as described herein.

In certain embodiments, the system 401 may include one or more motion detectors 428. The one or more motion detectors 428 may communicatively linked to the server 406 via one or more communication channels 427 (e.g., wired communication channels or wireless communication channels). The one or more motion detectors 428 may be positioned at or on the first camera 402 and/or the second camera 404, near the first camera 402 and/or the second camera 404, or between the first camera 402 and the second camera 404. The one or more motion detectors 403 may be configured to detection motion at (e.g., around) the first camera 402 and/or the second camera 404, near the first camera 402 and/or the second camera 404, or between the first camera 402 and the second camera 404.

In certain embodiments, the first camera 402 and the second camera 404 may be positioned a predetermined distance apart from each other. For example, the first camera 402 and the second camera 404 may be positioned within a corridor (e.g., a jetway between an airport terminal and aircraft) or at a place where objects or people move along a common path or in a common direction (e.g., in a single-file configuration or a relatively single-file configuration). For ease of discussion, the corridor or the place where objects or people move along a common path or a common direction will be referred to as a line.

As shown in FIG. 4, the line 410 has a first end 412 (e.g., a front end of the line 410) and a second end 414 (e.g. a back end of the line 410) that is opposite from the first end 412 of the line 410. The first camera 402 may be positioned at a location that is further towards the first end 412 of the line 410 relative to the position of the second camera 404. The second camera 404 may be positioned at a location that is further towards the second end 414 of the line 410 relative to the position of the first camera 402. In certain embodiments, the first camera 402 is positioned at a location at the first end 412. In certain embodiments, the second camera 404 is positioned at a location at the second end 414.

The first camera 402 may also be positioned so that a lens of the first camera 402 faces in a direction away from the first end 412, along the line 410, and towards the second end 414. The second camera 404 may also be positioned so that a lens of the second camera 404 faces in a direction away from the second end 414, along the line 410, and towards the first end 412. In certain embodiments, the first camera 402 may be positioned so that a lens of the first camera 402 faces in a direction where people or objects in view of the first camera 402 through the lens are moving towards the lens of the first camera 402. In certain embodiments, the second camera 404 may be positioned so that a lens of the second camera 404 faces in a direction where people or objects in view of the second camera 404 through the lens are moving away from the lens of the second camera 404.

In certain embodiments, the line 410 includes one or more objects each having an object type. For example, the line 410 may include one or more people, one or more large pieces of luggage (e.g., a suitcase, a wheeled suitcase, a hanging-clothes bag), one or more small pieces of luggage (e.g., a backpack, a large briefcase), one or more handbags (e.g., a purse, a small briefcase), or the like. People may be a first object type. Large pieces of luggage or large luggage may a second object type. Small pieces of luggage or small luggage may be a third object type. Hand bags may be a fourth object type. Objects such as people and luggage may move along the line 410 in a direction 416 from the second end 414 towards the first end 412. As described herein, the first camera 402 and the second camera 404 may capture images of the line 410 including image of the objects within the line 410 for object detection and recording.

Figure 5:
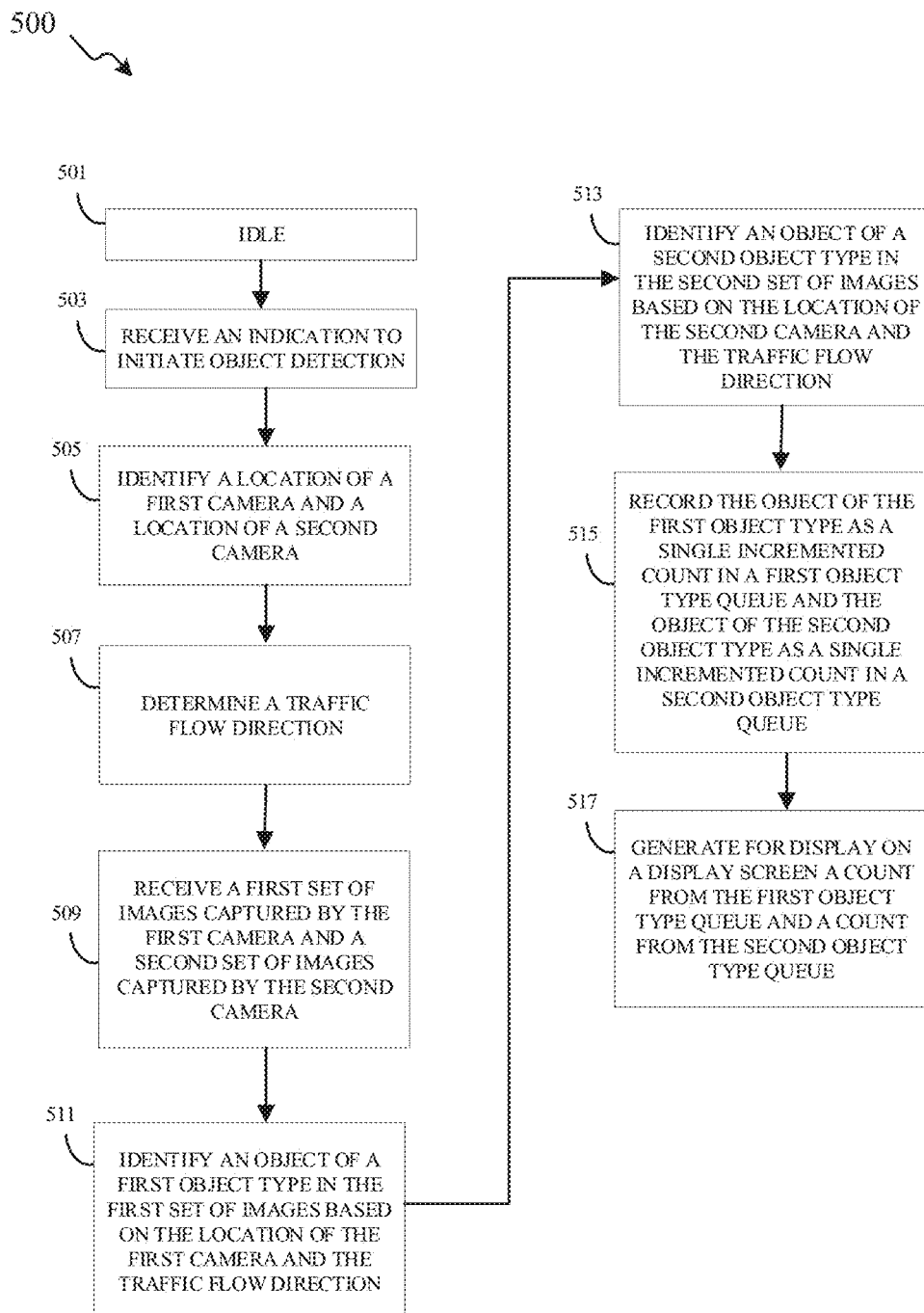
FIGS. 5-7 illustrate flow diagrams of methods for detecting and recording humans and objects according to certain embodiments of the disclosure.

FIG. 5 illustrates an example method 500 for a detecting and recording objects in a line according to certain embodiments of this disclosure. The method 500 could, for example, be implemented by a processor in the first camera 402, a processor in the second camera 404, a processor in the server 406, a processor in the electronic device 408, a combination thereof, or the like. The method 500 will be describe with respect to at least the example environment 400 illustrated in FIG. 4. Although certain details will be provided with reference to the method 500 of FIG. 5, it should be understood that other embodiments may include more, less, or different method steps.

At step 501, a processor is in an idle state at least with respect to detecting and recording objects within a line 410. At step 503, the processor receives an indication to initiate object detection. For example, the processor may receive a schedule (e.g., from a scheduling server, the server 406) indicating that aircraft passengers are scheduled to board an aircraft at a predetermined determined time. When the predetermined time becomes the current time, the processor initiates object detection and activates (e.g., transitions from off mode to an on mode, transitions from a sleep mode to an awake mode) the first camera 402 and the second camera 404 to begin capturing images or recording video. As another example, the processor may receive a schedule (e.g., from a scheduling server, the server 406) indicating that aircraft passengers are scheduled to deplane an aircraft at a predetermined determined time. The schedule may include one or more boarding times of one or more transport vehicles (e.g., aircrafts), one or more exit times of one or more transport vehicles, one or more departure times of one or more transport vehicles, one or more arrival times of one or more transport vehicles, or the like. The predetermined time may coincide or correlate with at least one of the one or more boarding times of the one or more transport vehicles, the one or more exit times of the one or more transport vehicles, the one or more departure times of the one or more transport vehicles, the one or more arrival times of the one or more transport vehicles, any other schedule time indicated by the schedule, or the like. When the predetermined time becomes the current time, the processor initiates object detection and activates the first camera 402 and the second camera 404 to begin capturing images or recording video.

In certain embodiments, the processor may initiate object detection when the processor receives an indication from at least one of the first camera 402 or the second camera 404 that motion is detected. For example, at least one of the first camera 402 or the second camera 404 may detect motion of an object (e.g., a person) moving towards a camera or away from a camera. In response to detecting motion of the object, at least one of the first camera 402 or the second camera 404 may inform (e.g., transmit a signal to) the processor that motion has been detected. The processor may initiate object detection when the processor is informed that object motion has been detected and activates at least one of the first camera 402 or the second camera 404 to begin capturing images or recording video for detecting and recording objects.

In certain embodiments, the processor may initiate object detection when the processor receives an indication from one or more motion detectors 428 (e.g., separate from at least one of the first camera 402 or the second camera 404) that motion is detected. For example, a motion detector 428 may detect motion of an object (e.g., a person). In response to detecting motion of the object, the motion detector 428 may inform (e.g., transmit a signal to) the processor that motion has been detected. The processor may initiate object detection when the processor is informed that object motion has been detected and activates at least one of the first camera 402 or the second camera 404 to begin capturing images or recording video for detecting and recording objects.

At step 505, the processor may determine a location of the first camera 402 and a location of the second camera 404. For example, the processor may receive a signal from the first camera 402 indicating that the first camera 402 is located on an end of a jetway that is away from an airport terminal and signal from the second camera 404 indicating that the second camera 404 is located on an end of the jetway that is closer to the airport terminal compared to the first camera 402. As another example, the processor may receive a signal from the first camera 402 indicating that the first camera 402 is located at a location along a line 410 that is closer to a front of the line 410 (or further from a back of the line 410) compared to the second camera 404 and/or signal from the second camera 404 indicating that the second camera 404 is located at a location along the line 410 that is further from a front of the line 410 (or closer to a back of the line 410) compared to the first camera 402.

In certain embodiments, the processor may receive a schedule (e.g., from a scheduling server, the server 406) indicating that aircraft passengers are scheduled to board an aircraft at a predetermined determined time. When the predetermined time becomes the current time, the processor initiates object detection and activates (e.g., transitions from off mode to an on mode, transitions from a sleep mode to an awake mode) the first camera 402 and the second camera 404 to begin capturing images or recording video. In response to receiving a captured image or a recorded video from the first camera 402 of an object (e.g., a person, a bag) facing away from or moving away from the first camera 402, the processor may determine that the first camera 402 is located on an end of the jetway that is closer to the airport terminal compared to the second camera 404. Additionally, or alternatively, in response to receiving a captured image or a recorded video from the second camera 404 of an object (e.g., a person, a bag) facing towards or moving towards the second camera 404, the processor may determine that the second camera 404 is located on an end of the jetway that is further from the airport terminal compared to the first camera 402.

In some embodiments, the processor may determine the location of the first camera 402 and/or the location of the second camera 404 based on a direction that an object is facing or moving towards in an image captured or a video recorded by the first camera 402 and/or the second camera 404. For example, the processor may receive an indication from at least one of the first camera 402, the second camera 404, or the motion detector 428 that motion is detected. In response to detecting motion, the processor may receive an indication that motion has been detected, initiate object detection, and activate (e.g., transitions from off mode to an on mode, transitions from a sleep mode to an awake mode) the first camera 402 and the second camera 404 to begin capturing images or recording video. In response to receiving a captured image or a recorded video from the first camera 402 of an object (e.g., a person, a bag) facing away from or moving away from the first camera 402, the processor may determine that the first camera 402 is located at a position along the line 410 that is closer to an end position of the line 410 (or that is further from a front position of the line 410) compared to the second camera 404. Additionally, or alternatively, in response to receiving a captured image or a recorded video from the second camera 404 of an object (e.g., a person, a bag) facing towards or moving towards the second camera 404, the processor may determine that the second camera 404 is located at a position along the line 410 that is further from an end position of the line 410 (or that is closer to a front position of the line 410) compared to the first camera 402.

At step 507, the processor determines a traffic flow direction 416. For example, the processor may receive a signal from the first camera 402 indicating that the first camera 402 is located on an end of a jetway that is away from an airport terminal and signal from the second camera 404 indicating that the second camera 404 is located on an end of the jetway that is closer to the airport terminal compared to the first camera 402. As another example, the processor may receive a signal from the first camera 402 indicating that the first camera 402 is located at a location along a line 410 that is closer to a front of the line 410 (or further from a back of the line 410) compared to the second camera 404 and/or signal from the second camera 404 indicating that the second camera 404 is located at a location along the line 410 that is further from a front of the line 410 (or closer to a back of the line 410) compared to the first camera 402. the processor may receive a schedule (e.g., from a scheduling server, the server 406) indicating that aircraft passengers are scheduled to board an aircraft at a predetermined determined time.

In certain embodiments, after receiving the one or more signals that allow the processor to determine the location of the first camera 402 and/or the location of the second camera 404, the processor may receive a schedule indicating that objects are scheduled to move from the first camera 402 and towards the second camera 404 at a predetermined time. When the predetermined time becomes the current time, the processor initiates object detection and activates (e.g., transitions from off mode to an on mode, transitions from a sleep mode to an awake mode) the first camera 402 and the second camera 404 and determines based on the schedule that the traffic flow direction 416 is such that objects are moving from the first camera 402 and towards the second camera 404.

In certain embodiments, after receiving the one or more signals that allow the processor to determine the location of the first camera 402 and/or the location of the second camera 404, the processor may receive a captured image or a recorded video of an object facing towards or moving towards the first camera 402 and facing away from or moving away from the second camera 404. The processor may determine that the traffic flow direction 416 is towards the first camera 402 and away from the second camera 404 based on the direction that the object is facing or the direction that the object is moving relative to the location of the first camera 402 and/or the location of the second camera 404.

At step 509, the processor receives a first set of one or more images captured by the first camera 402 and a second set of one or more images captured by the second camera 404. For example, after the processor initiates object detection, the processor may instruct the first camera 402 to initiate image capture and may receive a first set of one or more images captured by the first camera 402 or a first set of one or more images extracted from a recorded video. Each of the one or more image from the first set of one or more image may include a time stamp indicating a time that the image was captured. Similarly, after the processor initiates object detection, the processor may instruct the second camera 404 to initiate image capture and may receive a second set of one or more images captured by the second camera 404 or a second set of one or more images extracted from a recorded video. Each of the one or more images from the second set of one or more image may include a time stamp indicating a time that the image was captured. The one or more images of the first set of one or more images and/or the second set of one or more images may include an image of a person. The one or more images of the first set of one or more images and/or the second set of one or more images may include an image of a person carrying or toting a suitcase, a briefcase, a backpack, a purse, or the like.

Additionally, or alternatively, when the processor receives a first set of one or more images captured by the first camera 402, the processor may attach a time stamp to each of the one or more image from the first set of one or more images indicating a time that each of the images was received by the processor. Similarly, when the processor receives a second set of one or more images captured by the second camera 404, the processor may attach a time stamp to each of the one or more images from the second set of one or more images indicating a time that each of the images was received by the processor. As described herein, the one or more images of the first set of one or more images and/or the second set of one or more images may include an image of a person. The one or more images of the first set of one or more images and/or the second set of one or more images may include an image of a person carrying or toting a suitcase, a briefcase, a backpack, a purse, or the like. By attaching a time stamp to each of the received images, the processor may determine an order that the images where captured by a camera and/or received by the processor. Determining an order of when the images were captured by a camera and/or received by a processor may provide the processor with an indication of a direction that identified objects within the images are moving by comparing changes in relative positions of objects (e.g., identified objects) between successive time-stamped images.

At step 511, the processor identifies an object of a first object type in the first set of one or more images based on the location of the first camera 402 and the traffic flow direction 416. The processor may identify an object of a first object type based on the location of the first camera 402. For example, the processor may determine that the location of the first camera 402 is on an end of a jetway that is away from an airport terminal relative to the second camera 404 or is at a location along a line 410 that is closer to a front of the line 410 (or further from a back of the line 410) compared to the second camera 404. The processor may also determine that the traffic flow direction is towards the first camera 402 and away from the second camera 404. As described herein, the processor may receive the first set of one or more images from the first camera 402 based on the location of the first camera 402 and the traffic flow direction 416 moving towards the first camera 402.

The processor may identify one or more objects of a first object type from the first set of one or more images based on the location of the first camera 402 and the traffic flow direction 416. For example, when the traffic flow direction of line 410 is towards the first camera 402, the processor is configured to identify people as a first object type from the first set of one or more images. Because people are walking towards the first camera 402 and thus facing the first camera 402, the processor can easily identify and anonymously distinguish between different people based on people having different faces and/or body sizes/shapes.

At step 513, the processor identifies an object of a second object type in the second set of one or more images based on the location of the second camera 404 and the traffic flow direction 416. The processor may identify an object of a second object type based on the location of the first camera 402. For example, the processor may determine that the location of the second camera 404 is on an end of a jetway that is closer to an airport terminal relative to the first camera 402 or is at a location along a line 410 that is further away from a front of the line 410 (or further towards a back of the line 410) compared to the first camera 402. The processor may also determine that the traffic flow direction 416 is away from the second camera 404 and towards the first camera 402. As described herein, the processor may receive the second set of one or more images from the second camera 404 based on the location of the second camera 404 and the traffic flow direction 416 moving away from the second camera 404.

The processor may identify one or more objects of a second object type from the second set of one or more images based on the location of the second camera 404 and the traffic flow direction 416. For example, when the traffic flow direction of line 410 is away from the second camera 404, the processor is configured to identify suitcases as a second object type. Because suitcases may be carried on a side or a back of a person as the person walks away from the second camera 404, the processor can easily identify and easily distinguish between different suitcases and other objects based on clear view of suitcases having different sizes, shapes, and colors. In certain embodiments, when the traffic flow direction of line 410 is away from the second camera 404, the processor is configured to identify suitcases as a second object type, backpacks as a third object type, and purses as a fourth object type.

At step 515, the processor records the object of the first object type as a single incremented count in a first object type queue and records the object of the second object type as a single incremented count in a second object type queue. For example, upon detecting an image of a first object of a first object type (e.g., a person) in a first image of the first set of one or more images, the processor may assign a first tag (such as an anonymous tag) or a unique identification (ID) (such as a unique anonymous ID) to the image of the first object of the first object type in the first image of the first set of images. The processor may associate one or more pixels with the first object of the first object type in the first image. When the processor receives a second image of the first set of one or more images, the processor may identify an image of the first object of the first object type in the second image of the first set of one or more images based on the previously assigned pixels from the first image and assign the same first tag to the image of the first object of the first object type in the second image of the first set of one or more images. For example, the processor may determine that one or more other objects in the second image may have shifted occupied pixels a same or similar amount of pixels in a same or similar direction between the first image and the second image. The processor may compare the shift in occupied pixels of the one or more objects between the first image and the second image and map an object in the second image to the first object of the first object type in the first image based on the shift. The processor may assign the same tag or unique ID to the first object of the first object type in the second image of the first set of one or more images based on mapping the first object in the second image to the first object in the first image.

In certain embodiments, the processor may continue to receive subsequent images of the first set of one or more images (e.g. from the first camera 402) and the processor will continue to identify images of the first object of the first object type and assign the first tag to each of those images. When a subsequent image of the first set of images (determined based on the time stamps of each of the images) no longer contains an image of the first object of the first object type, the processor can record a single incremented count of one object of the first object type that is accumulated in a queue designated for the objects of the first object type to record a number of objects of the first object type that have moved through the line 410. The processor may also include a time stamp attached to and indicating when each of the objects of the first object type are recorded.

Similarly, upon detecting an image of a first object of a second object type (e.g., a suitcase) in a first image of the second set of one or more images, the processor may assign a first tag to the image of the first object of the second object type in the first image of the second set of images. For example, upon detecting an image of a first object of a second object type (e.g., a suitcase) in a first image of the second set of one or more images, the processor may assign a first tag (such as an anonymous tag) or a unique identification (ID) (such as a unique anonymous ID) to the image of the first object of the second object type in the first image of the second set of images. The processor may associate one or more pixels with the first object of the second object type in the first image. When the processor receives a second image of the second set of one or more images, the processor may identify an image of the first object of the second object type in the second image of the second set of one or more images based on the previously assigned pixels from the first image and assign the same first tag to the image of the first object of the second object type in the second image of the first set of one or more images. For example, the processor may determine that one or more other objects in the second image may have shifted occupied pixels a same or similar amount of pixels in a same or similar direction between the first image and the second image. The processor may compare the shift in occupied pixels of the one or more objects between the first image and the second image and map an object in the second image to the first object of the second object type in the first image based on the shift. The processor may assign the same tag or unique ID to the first object of the second object type in the second image of the second set of one or more images based on mapping the first object in the second image to the first object in the first image.

In certain embodiments, the processor may continue to receive subsequent images of the second set of one or more images (e.g. from the second camera 404) and the processor will continue to identify images of the first object of the second object type and assign the first tag to each of those images. When a subsequent image of the second set of images (determined based on the time stamps of each of the images) no longer contains an image of the first object of the second object type, the processor can record a single incremented count of one object of the second object type (e.g., a suitcase) that is accumulated in a queue designated for the second object type to record a number of objects of the second object type that have moved through the line 410. The processor may also include a time stamp attached to and indicating when each of the objects of the second object type are recorded.

At step 517, the processor generates for display on a display screen a current accumulated count from the first object type queue and a current accumulated count from the second object type queue. For example, the processor may have identified a plurality of images of different objects of the first object type (e.g., people) in images of the first set of one or more images, assigned a different tag to each object of the first object type, and recorded each object of the first object type (or tag assigned to each object of the first object type) as a single increment count in a queue associated with the first object type. When, for example, the processor stops receiving images of the first set of one or more images (e.g., from the first camera 402) or after a period of time from when the processor began receiving images of the first set of one or more images (e.g., from the first camera 402), the processor may transmit the total count of objects of the first object type recorded in the queue associated with the first object type to the electronic device 408 for display and reporting. Providing the total count of objects of a first object type (e.g., people) may help determine how many objects of the same object type (e.g., people) have exited from or entered on to a transport vehicle such as a buss, a train, or an aircraft. Providing the total count of objects of a first object type (e.g., people) may help determine how many objects of the same object type (e.g., people) have exited from or entered into a room such as a theatre, conference hall, or stadium. Additionally, or alternatively, a current accumulated count from the first object type queue and a current accumulated count from the second object type queue may be transmitted to a data storage unit (e.g., the persistent storage 212 illustrated in FIG. 2) for storage and use with one or more analytical models (e.g., one or more analytical models for display).

As another example, the processor may have identified a plurality of images of different objects of the second object type (e.g., suitcases) in images of the second set of one or more images, assigned a different tag to each object of the second object type, and recorded each object of the second object type (or tag assigned to each object of the second object type) as a single increment count in a queue associated with the second object type. When, for example, the processor stops receiving images of the second set of one or more images (e.g., from the second camera 404) or after a period of time from when the processor began receiving images of the second set of one or more images (e.g., from the second camera 404), the processor may transmit the total count of objects of the second object type recorded in the queue associated with the second object type to the electronic device 408 for display and reporting. Providing the total count of objects of a second object type (e.g., suitcases) may help determine how many objects of the same object type (e.g., suitcases) have exited from or entered on to a transport vehicle such as a buss, a train, or an aircraft. Providing the total count of objects of a second object type (e.g., suitcases) may help determine how many objects of the same object type (e.g., suitcases) have exited from or entered into a room such as a theatre, conference hall, or stadium. The total counts may be used to anticipate when seating and/or storage space in a transport vehicle will be completely occupied and allow for personnel to find alternative seating and storage locations in a more efficient manner to reduce transport vehicle turn times.

Figure 6:
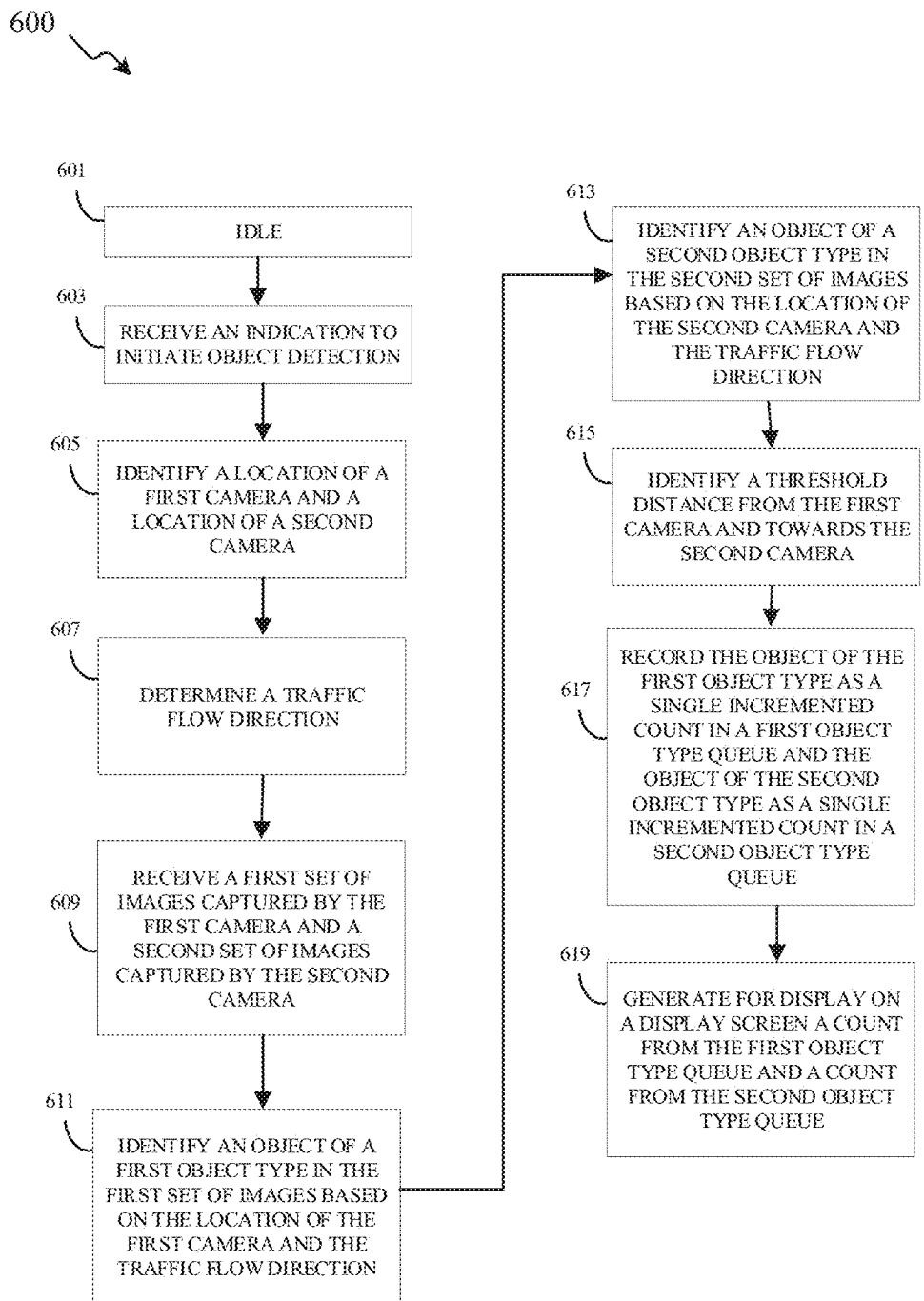

FIG. 6 illustrates an example method 600 for a detecting and recording objects in a line according to certain embodiments of this disclosure. The method 600 could, for example, be implemented by a processor in the first camera 402, a processor in the second camera 404, a processor in the server 406, a processor in the electronic device 408, a combination thereof, or the like. The method 600 will be describe with respect to at least the example environment 400 illustrated in FIG. 4. Although certain details will be provided with reference to the method 600 of FIG. 6, it should be understood that other embodiments may include more, less, or different method steps.

At step 601, a processor is in an idle state at least with respect to detecting and recording objects within a line 410. Step 601 is at least similar to step 501 of method 500 illustrated in FIG. 5. At step 603, the processor receives an indication to initiate object detection. Step 603 is at least similar to step 503 of method 500 illustrated in FIG. 5. At step 605, the processor may determine a location of the first camera 402 and a location of the second camera 404. Step 605 is at least similar to step 505 of method 500 illustrated in FIG. 5. At step 607, the processor determines a traffic flow direction 416. Step 607 is at least similar to step 507 of method 500 illustrated in FIG. 5. At step 609, the processor receives a first set of one or more images captured by the first camera 402 and a second set of one or more images captured by the second camera 404. Step 609 is at least similar to step 509 of method 500 illustrated in FIG. 5. At step 611, the processor identifies an object of a first object type in the first set of one or more images based on the location of the first camera 402 and the traffic flow direction 416. Step 611 is at least similar to step 511 of method 500 illustrated in FIG. 5. At step 613, the processor identifies an object of a second object type in the second set of one or more images based on the location of the second camera 404 and the traffic flow direction 416. Step 613 is at least similar to step 513 of method 500 illustrated in FIG. 5.

At step 615, the processor identifies a threshold distance 430 from the first camera 402 and towards the second camera 404. For example, the processor may receive an image from the first camera 402 (e.g., an image from the first set of one or more images) and/or an image from the second camera (e.g., an image from the second set of one or more images) and identify a threshold distance 430 between the first camera 402 and the second camera 404. In certain embodiments, the threshold distance 430 may include an identified physical mark along the line 410. Additionally, or alternatively, the threshold distance 430 may include a virtual threshold calculated by the processor using an image from the first set of one or more images or the second set of one or more images.

At step 617, the processor records the object of the first object type as a single incremented count in a first object type queue and records the object of the second object type as a single incremented count in a second object type queue. For example, when a first image of the first set one or more images includes an image of a first object of a first object type that is located behind the threshold distance 430 (as the object moves from the back of the line 410 towards the front of the line 410), the image of the first object or tag assigned to the image of the first object type may not be recorded as a single increment count in a queue associated with the first object type. When a second image (e.g., a subsequent image identified by the time stamps of the first image and the second image) of the first set one or more images includes an image of the first object of the first object type that is located beyond the threshold distance 430 (after the object has moved across the threshold distance 430 from the back of the line 410 towards the front of the line 410), the image of the first object of the first object type or a tag assigned to the image of the first object of the first object type may be recorded as a single increment count in a queue associated with the first object type. The processor may also include a time stamp attached to and indicating when each of the objects of the first object type are recorded. It should be understood that pixel shifting process describe with respect to step 515 of FIG. 5 may implemented with step 617 of FIG. 6.

Similarly, when a first image of the second set one or more images includes an image of a first object of a second object type that is located behind the threshold distance 430 (as the object moves from the back of the line 410 towards the front of the line 410), the image of the first object or tag assigned to the image of the first object type may not be recorded as a single increment count in a queue associated with the second object type. When a second image (e.g., a subsequent image identified by the time stamps of the first image and the second image) of the second set one or more images includes an image of the first object of the second object type that is located beyond the threshold distance 430 (after the object has moved across the threshold distance 430 from the back of the line 410 towards the front of the line 410), the image of the first object of the second object type or a tag assigned to the image of the first object of the second object type may be recorded as a single increment count in a queue associated with the second object type. It should be understood that pixel shifting process describe with respect to step 515 of FIG. 5 may implemented with step 617 of FIG. 6.

At step 619, the processor generates for display on a display screen a current accumulated count from the first object type queue and a current accumulated count from the second object type queue. Step 619 is at least similar to step 517 of method 500 illustrated in FIG. 5.

Figure 7:
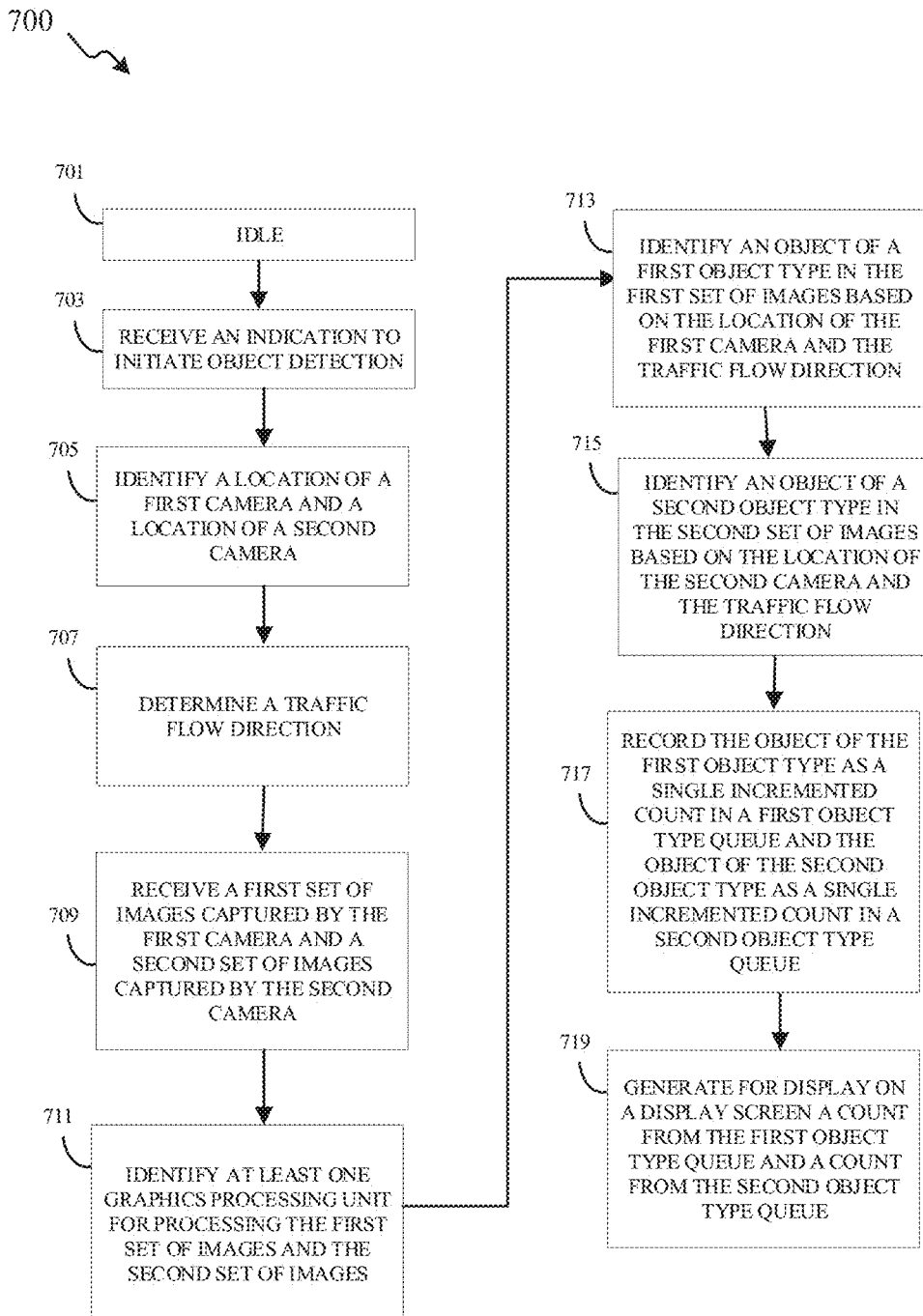

FIG. 7 illustrates an example method 700 for a detecting and recording objects in a line according to certain embodiments of this disclosure. The method 700 could, for example, be implemented by a processor in the first camera 402, a processor in the second camera 404, a processor in the server 406, a processor in the electronic device 408, a combination thereof, or the like. The method 700 will be describe with respect to at least the example environment 400 illustrated in FIG. 4. Although certain details will be provided with reference to the method 700 of FIG. 7, it should be understood that other embodiments may include more, less, or different method steps.

At step 701, a processor is in an idle state at least with respect to detecting and recording objects within a line 410. Step 701 is at least similar to step 501 of method 500 illustrated in FIG. 5. At step 703, the processor receives an indication to initiate object detection. Step 703 is at least similar to step 503 of method 500 illustrated in FIG. 5. At step 705, the processor may determine a location of the first camera 402 and a location of the second camera 404. Step 705 is at least similar to step 505 of method 500 illustrated in FIG. 5. At step 707, the processor determines a traffic flow direction 416. Step 707 is at least similar to step 507 of method 500 illustrated in FIG. 5. At step 709, the processor receives a first set of one or more images captured by the first camera 402 and a second set of one or more images captured by the second camera 404. Step 709 is at least similar to step 509 of method 500 illustrated in FIG. 5.

At step 711, the processor identifies at least one graphics processing unit (GPU) for processing the first set of one or more images and the second set of one or more images. For example, the processor may determine that the first server 406 includes one or more GPUs. The processor may identify at least one GPU of the one or more GPUs that is in an idle state or that has enough reserve capacity to process at least one of the first set of one or more images or the second set of one or more images. The processor may select the at least one GPU and instruct the at least one GPU to process at least one of the first set of one or more images or the second set of one or more images to identify objects within the images associated with specific object types.

As another example, the processor may determine that each of the additional servers 417 includes a GPU. The processor may identify at least one GPU of at least one additional server 417 that is in an idle state or that has enough reserve capacity to process at least one of the first set of one or more images or the second set of one or more images. The processor may select the at least one GPU from at least one of the additional servers 417 and instruct the at least one GPU of the at least one additional server 417 to process at least one of the first set of one or more images or the second set of one or more images to identify objects within the images associated with specific object types. Once the processor utilizes one or more selected GPUs for processing of the first set of one or more images or the second set of one or more image and completes the processing, the processor can deactivate or shutdown the selected GPUs for subsequently utilization for one or more subsequently received sets of one or more images.

At step 713, the processor identifies an object of a first object type in the first set of one or more images based on the location of the first camera 402 and the traffic flow direction 416. Step 713 is at least similar to step 511 of method 500 illustrated in FIG. 5. At step 715, the processor identifies an object of a second object type in the second set of one or more images based on the location of the second camera 404 and the traffic flow direction 416. Step 715 is at least similar to step 513 of method 500 illustrated in FIG. 5. At step 717, the processor records the object of the first object type as a single incremented count in a first object type queue and records the object of the second object type as a single incremented count in a second object type queue. Step 717 is at least similar to step 515 of method 500 illustrated in FIG. 5. At step 719, the processor generates for display on a display screen a current accumulated count from the first object type queue and a current accumulated count from the second object type queue. Step 719 is at least similar to step 517 of method 500 illustrated in FIG. 5.

Figure 8:
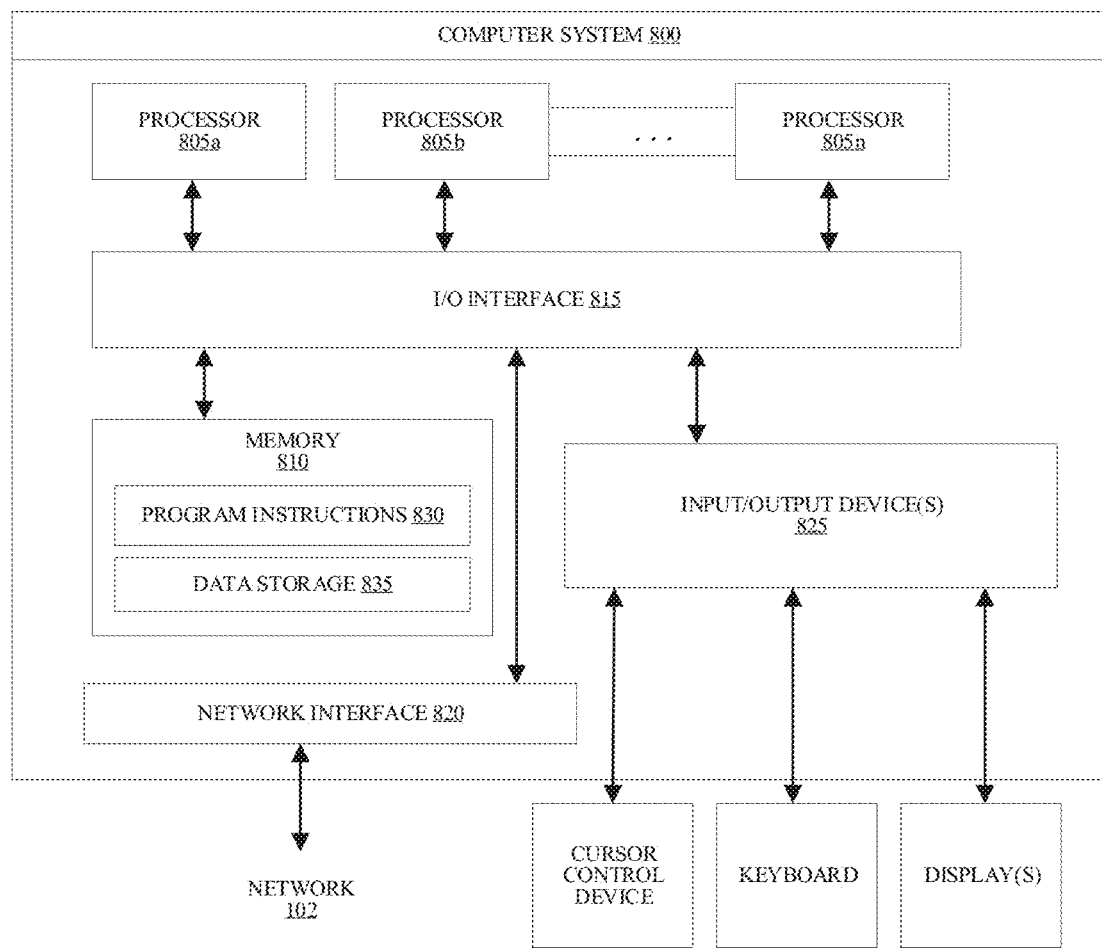
FIG. 8 illustrates a non-limiting, example computer system configured to implement aspects of apparatuses, systems, and methods according to certain embodiments of this disclosure.

FIG. 8 illustrates a non-limiting, example computer system 800 configured to implement systems and methods for performing one or more interactive gaming operations according to certain embodiments of this disclosure. FIG. 8 illustrates a computer system 800 that is configured to execute any and all of the embodiments described herein. In certain embodiments, the computer system 800 describes a server of the one or more servers 104, a client device of the one or more client devices 106, 108, 112, or 114, an image capturing device of the one or more image capturing device 116, or may be part of the network 102 of FIG. 1. In certain embodiments, the computer system 800 describes one or more components of the electronic device 200 of FIG. 2 or one or more components of the electronic device 300 of FIG. 3. In certain embodiments, the computer system 800 describes one or more components of the system 401, the first camera 402, the second camera 404, the first server 406, the electronic device 408, or the one or more additional servers 417 of FIG. 4.

In different embodiments, the computer system 800 may be any of various types of devices, including, but not limited to, a computer embedded in a vehicle, a computer embedded in an appliance, a personal computer system, a desktop computer, a handset (e.g., a laptop computer, a notebook computer, a tablet, a slate, a netbook computer, a camera, a handheld video game device, a handheld computer, a video recording device, a consumer device, a portable storage device, or the like), a mainframe computer system, a workstation, network computer, a set top box, a video game console, a mobile device (e.g., electronic controller 301 of a handset), an application server, a storage device, a television, a peripheral device such as a switch, modem, router, or in general any type of computing or electronic device.

Various embodiments of a system and method for a detecting and recording objects in a line, as described herein, may be executed on one or more computer systems 800, which may interact with various other devices. In the illustrated embodiment, the computer system 800 includes one or more processors 805 coupled to a system memory 810 via an input/output (I/O) interface 815. The computer system 800 further includes a network interface 820 coupled to I/O interface 815, and one or more input/output devices 825, such as cursor control device, keyboard, and display(s). In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 805a, or a multiprocessor system including several processors 805a-805n (e.g., two, four, eight, or another suitable number). The processors 805 may be any suitable processor capable of executing instructions. For example, in various embodiments the processors 805 may be general-purpose or embedded processors implementing any of a variety of instruction set architectures (ISAs), such as the x86, PowerPC, SPARC, or MIPS ISAs, or any other suitable ISA. In multiprocessor systems, each of processors 805 may commonly, but not necessarily, implement the same ISA.

The system memory 810 may be configured to store the program instructions 830 and/or existing state information and ownership transition condition data in the data storage 835 accessible by the processor 805. In various embodiments, the system memory 810 may be implemented using any suitable memory technology, such as static random access memory (SRAM), synchronous dynamic RAM (SDRAM), nonvolatile/Flash-type memory, or any other type of memory. In the illustrated embodiment, the program instructions 830 may be configured to implement a system for a detecting and recording objects in a line incorporating any of the functionality, as described herein. In some embodiments, program instructions and/or data may be received, sent, or stored upon different types of computer-accessible media or on similar media separate from the system memory 810 or the computer system 800. The computer system 800 is described as implementing at least some of the functionality of functional blocks of previous Figures.

In one embodiment, the I/O interface 815 may be configured to coordinate I/O traffic between the processor 805, the system memory 810, and any peripheral devices in the device, including the network interface 820 or other peripheral interfaces, such as the input/output devices 825. In some embodiments, the I/O interface 815 may perform any necessary protocol, timing or other data transformations to convert data signals from one component (e.g., the system memory 810) into a format suitable for use by another component (e.g., the processor 805). In some embodiments, the I/O interface 815 may include support for devices attached through various types of peripheral buses, such as a variant of the Peripheral Component Interconnect (PCI) bus standard or the Universal Serial Bus (USB) standard, for example. In some embodiments, the function of the I/O interface 815 may be split into two or more separate components, such as a north bridge and a south bridge, for example. Also, in some embodiments some or all of the functionality of the I/O interface 815, such as an interface to the system memory 810, may be incorporated directly into the processor 805.

The network interface 820 may be configured to allow data to be exchanged between the computer system 800 and other devices attached to the network 102 or between nodes of the computer system 800. The network 102 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 820 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 825 may, in some embodiments, include one or more display terminals, keyboards, keypads, touchpads, scanning devices, voice, or optical recognition devices, or any other devices suitable for entering or accessing data by one or more the computer systems 800. Further, various other sensors may be included in the I/O devices 825, such as imaging sensors, barometers, altimeters, LIDAR, or any suitable environmental sensor. Multiple input/output devices 825 may be present in the computer system 800 or may be distributed on various nodes of the computer system 800. In some embodiments, similar input/output devices may be separate from the computer system 800 and may interact with one or more nodes of the computer system 800 through a wired or wireless connection, such as over the network interface 820.

As shown in FIG. 8, the memory 810 may include program instructions 830, which may be processor-executable to implement any element or action, as described herein. In one embodiment, the program instructions may implement at least a portion of methods described herein, such as the methods illustrated by FIGS. 5-7. In other embodiments, different elements and data may be included. Note that the data storage 835 may include any data or information, as described herein.

Those skilled in the art will appreciate that the computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions, structured data) on a computer-accessible medium or a portable article to be read by an appropriate drive, various examples of which are described here. In some embodiments, instructions stored on a computer-accessible medium separate from the computer system 800 may be transmitted to the computer system 800 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

Thus, the disclosure provides, among other things, a system for a detecting and recording objects in a line, including a computing system. None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for detecting objects in traffic flow, the method comprising:
   identifying, by at least one processor, a location of a first camera and a location of a second camera, wherein the first camera and the second camera are positioned on opposite ends of a flow of traffic;
   determining, by the at least one processor, a traffic flow direction relative to the location of the first camera and the location of the second camera;
   receiving, by the at least one processor, a first image set captured by the first camera and a second image set captured by the second camera;
   identifying, by the at least one processor, an object of a first object type in the first image set based on the location of the first camera and the traffic flow direction;
   identifying, by the at least one processor, an object of a second object type in the second image set based on the location of the second camera and the traffic flow direction; and
   recording, by the at least one processor, the object of the first object type as a single incremented count in a first object type queue and the object of the second object type as a single incremented count in a second object type queue.

2. The method of claim 1, wherein determining, by the at least one processor, the traffic flow direction comprises:
   receiving, by the at least one processor, a schedule indicating a predicted traffic flow direction and a period of time associated with the predicted traffic flow direction; and
   determining, by the at least one processor, the traffic flow direction when a current time is within the period of time.

3. The method of claim 1, wherein determining, by the at least one processor, the traffic flow direction comprises:
   receiving, by the at least one processor, at least one of a first indication that an object is moving towards a lens of the first camera or a second indication that an object is moving towards a lens of the second camera; and
   determining, by the at least one processor, the traffic flow direction based on receiving one of the first indication or the second indication.

4. The method of claim 1, wherein each image of the first image set and each image of the second image set comprise a time stamp indicating an image capture time.

5. The method of claim 1, wherein the first image set comprises at least two images captured by the first camera and the second image set comprises at least two images captured by the second camera.

6. The method of claim 5, further comprising:
identifying, by the at least one processor, a threshold distance from the first camera and towards the second camera; and
wherein:
the at least two images captured by the first camera comprise a first image captured by the first camera and a second image captured by the first camera,
the first image captured by the first camera includes an image of the object of the first object type when the object of the first object type is located at a distance that is greater than the threshold distance from the first camera and towards the second camera,
the second image captured by the first camera includes an image of the object of the first object type when the object of the first object type is located at a distance that is no greater than the threshold distance from the first camera and towards the second camera, and
recording, by the at least one processor, the object of the first object type as the single incremented count in the first object type queue based on the first image captured by the first camera and the second image captured by the first camera.

7. The method of claim 5, further comprising:
identifying, by the at least one processor, a threshold distance from the second camera and towards the first camera; and
wherein:
the at least two images captured by the second camera comprise a first image captured by the second camera and a second image captured by the second camera,
the first image captured by the second camera includes an image of the object of the second object type when the object of the second object type is located at a distance that is less than the threshold distance from the second camera and towards the first camera, and
the second image captured by the second camera includes the image of the object of the second object type when the object of the second object type is located at a distance that is no less than the threshold distance from the second camera and towards the first camera, and
recording, by the at least one processor, the object of the second object type as the single incremented count in the second object type queue based on the first image captured by the second camera and the second image captured by the second camera.

8. A system for detecting objects in traffic flow, the system comprising:
a first camera;
a second camera; and
at least one processor configured to:
identify a location of the first camera and a location of the second camera, wherein the first camera and the second camera are positioned on opposite ends of a flow of traffic,
determine a traffic flow direction relative to the location of the first camera and the location of the second camera,
receive a first image set captured by the first camera and a second image set captured by the second camera,
identify an object of a first object type in the first image set based on the location of the first camera and the traffic flow direction,
identify an object of a second object type in the second image set based on the location of the second camera and the traffic flow direction, and
record the object of the first object type as a single incremented count in a first object type queue and the object of the second object type as a single incremented count in a second object type queue.

9. The system of claim 8, wherein to determine the traffic flow direction, the at least one processor is configured to:
receive a schedule indicating a predicted traffic flow direction and a period of time associated with the predicted traffic flow direction; and
determine the traffic flow direction when a current time is within the period of time.

10. The system of claim 8, wherein to determine the traffic flow direction, the at least one processor is configured to:
receive at least one of a first indication that an object is moving towards a lens of the first camera or a second indication that an object is moving towards a lens of the second camera, and
determine the traffic flow direction based on receiving one of the first indication or the second indication.

11. The system of claim 8, wherein each image of the first image set and each image of the second image set comprise a time stamp indicating an image capture time.

12. The system of claim 8, wherein the first image set comprises at least two images captured by the first camera and the second image set comprises at least two images captured by the second camera.

13. The system of claim 12, wherein:
the at least one processor is further configured to identify a threshold distance from the first camera and towards the second camera;
the at least two images captured by the first camera comprise a first image captured by the first camera and a second image captured by the first camera;
the first image captured by the first camera includes an image of the object of the first object type when the object of the first object type is located at a distance that is greater than the threshold distance from the first camera and towards the second camera;
the second image captured by the first camera includes an image of the object of the first object type when the object of the first object type is located at a distance that is no greater than the threshold distance from the first camera and towards the second camera; and
the at least one processor is further configured to record the object of the first object type as the single incremented count in the first object type queue based on the first image captured by the first camera and the second image captured by the first camera.

14. The system of claim 12, wherein:
the at least one processor is further configured to identify a threshold distance from the second camera and towards the first camera;
the at least two images captured by the second camera comprise a first image captured by the second camera and a second image captured by the second camera;

the first image captured by the second camera includes an image of the object of the second object type when the object of the second object type is located at a distance that is less than the threshold distance from the second camera and towards the first camera;

the second image captured by the second camera includes the image of the object of the second object type when the object of the second object type is located at a distance that is no less than the threshold distance from the second camera and towards the first camera; and the at least one processor is further configured to record the object of the second object type as the single incremented count in the second object type queue based on the first image captured by the second camera and the second image captured by the second camera.

15. A non-transitory, computer-readable storage medium storing one or more electronically executable instructions that, when executed by at least one processor, cause the at least one processor to:

identify a location of a first camera and a location of a second camera, wherein the first camera and the second camera are positioned on opposite ends of a flow of traffic;

determine a traffic flow direction relative to the location of the first camera and the location of the second camera;

receive a first image set captured by the first camera and a second image set captured by the second camera;

identify an object of a first object type in the first image set based on the location of the first camera and the traffic flow direction;

identify an object of a second object type in the second image set based on the location of the second camera and the traffic flow direction; and record the object of the first object type as a single incremented count in a first object type queue and the object of the second object type as a single incremented count in a second object type queue.

16. The non-transitory, computer-readable storage medium of claim 15, wherein to determine the traffic flow direction, the one or more electronically executable instructions cause the at least one processor to:

receive a schedule indicating a predicted traffic flow direction and a period of time associated with the predicted traffic flow direction; and determine the traffic flow direction when a current time is within the period of time.

17. The non-transitory, computer-readable storage medium of claim 15, wherein to determine the traffic flow direction, the one or more electronically executable instructions cause the at least one processor to:

receive at least one of a first indication that an object is moving towards a lens of the first camera or a second indication that an object is moving towards a lens of the second camera, and determine the traffic flow direction based on receiving one of the first indication or the second indication.

18. The non-transitory, computer-readable storage medium of claim 15, wherein the first image set comprises at least two images captured by the first camera and the second image set comprises at least two images captured by the second camera.

19. The non-transitory, computer-readable storage medium of claim 18, wherein:

the one or more electronically executable instructions further cause the at least one processor to identify a threshold distance from the first camera and towards the second camera;

the at least two images captured by the first camera comprise a first image captured by the first camera and a second image captured by the first camera;

the first image captured by the first camera includes an image of the object of the first object type when the object of the first object type is located at a distance that is greater than the threshold distance from the first camera and towards the second camera;

the second image captured by the first camera includes an image of the object of the first object type when the object of the first object type is located at a distance that is no greater than the threshold distance from the first camera and towards the second camera; and the one or more electronically executable instructions further cause the at least one processor to record the object of the first object type as the single incremented count in the first object type queue based on the first image captured by the first camera and the second image captured by the first camera.

20. The non-transitory, computer-readable storage medium of claim 18, wherein:

the one or more electronically executable instructions further cause the at least one processor to identify a threshold distance from the second camera and towards the first camera;

the at least two images captured by the second camera comprise a first image captured by the second camera and a second image captured by the second camera;

the first image captured by the second camera includes an image of the object of the second object type when the object of the second object type is located at a distance that is less than the threshold distance from the second camera and towards the first camera;

the second image captured by the second camera includes the image of the object of the second object type when the object of the second object type is located at a distance that is no less than the threshold distance from the second camera and towards the first camera; and the one or more electronically executable instructions further cause the at least one processor to record the object of the second object type as the single incremented count in the second object type queue based on the first image captured by the second camera and the second image captured by the second camera.

* * * * *